(12) United States Patent
Trejo et al.

(10) Patent No.: US 10,899,086 B2
(45) Date of Patent: Jan. 26, 2021

(54) STRENGTHENED SEAM ARTICLES AND METHODS OF MAKING THE SAME

(71) Applicant: Printpack Illinois, Inc., Elgin, IL (US)

(72) Inventors: Alberto Rodriguez Trejo, Quéretaro (MX); Antonio Badillo Lopez, Quéretaro (MX); Teodoro Contreras Morales, Quéretaro (MX)

(73) Assignee: PRINTPACK ILLINOIS, INC., Elgin, IL (US)

( * ) Notice: Subject to any disclaimer, the term of this patent is extended or adjusted under 35 U.S.C. 154(b) by 135 days.

(21) Appl. No.: 16/321,862

(22) PCT Filed: Aug. 23, 2016

(86) PCT No.: PCT/US2016/048188
§ 371 (c)(1),
(2) Date: Jan. 30, 2019

(87) PCT Pub. No.: WO2018/038709
PCT Pub. Date: Mar. 1, 2018

(65) Prior Publication Data
US 2019/0184649 A1  Jun. 20, 2019

(51) Int. Cl.
*B29C 65/00* (2006.01)
*B29C 65/48* (2006.01)
(Continued)

(52) U.S. Cl.
CPC ............ *B29C 66/232* (2013.01); *B29C 65/48* (2013.01); *B29C 65/4815* (2013.01);
(Continued)

(58) Field of Classification Search
CPC .............. B29C 66/232; B29C 65/4815; B29C 65/8207; B29C 66/1122; B29C 66/21;
(Continued)

(56) References Cited

U.S. PATENT DOCUMENTS 4,007,671 A  2/1977  Duncan
5,085,718 A  2/1992  Wank et al.

FOREIGN PATENT DOCUMENTS

JP    06340750 A    12/1994
JP    2001290384 A  10/2001

OTHER PUBLICATIONS

International Preliminary Report on Patentability, PCT/US2016/048188, 23 pages, dated Jan. 18, 2019.
(Continued)

*Primary Examiner* — Michael C Miggins
(74) *Attorney, Agent, or Firm* — Eversheds Sutherland (US) LLP

(57) ABSTRACT

Articles having mechanically strengthened seams (320) and methods of making the same are provided. An article includes at least one material sheet (311) and a seam (320) formed from an overlap of two portions (310, 314) of the at least one material sheet (311) and an adhesive (312) deposited between the two portions (310, 314) of the at least one material sheet (311) along at least a portion of the overlap, the adhesive (312) sealing the two portions (310, 314) of the at least one material sheet (311), wherein at least one of the two portions (310, 314) of the material sheet (311) comprises a plurality of indents (322) on a surface thereof, such that the adhesive (312) penetrates the material sheet (311) at the indents (322) to provide a mechanical bond between the two portions (310, 314) of the at least one material sheet (311).

27 Claims, 6 Drawing Sheets

(51) Int. Cl.
- B29C 65/82 (2006.01)
- B31B 70/62 (2017.01)
- B31B 70/00 (2017.01)
- B65D 30/20 (2006.01)
- B31B 70/26 (2017.01)
- B31B 70/68 (2017.01)
- B31B 70/14 (2017.01)
- B29C 65/74 (2006.01)
- B65D 30/08 (2006.01)
- B29L 31/00 (2006.01)
- B31B 160/20 (2017.01)
- B31B 150/10 (2017.01)
- B29C 65/14 (2006.01)
- B31B 170/20 (2017.01)

(52) U.S. Cl.
CPC .......... *B29C 65/74* (2013.01); *B29C 65/8207* (2013.01); *B29C 66/1122* (2013.01); *B29C 66/21* (2013.01); *B29C 66/30325* (2013.01); *B29C 66/4322* (2013.01); *B29C 66/729* (2013.01); *B29C 66/8511* (2013.01); *B31B 70/008* (2017.08); *B31B 70/142* (2017.08); *B31B 70/25* (2017.08); *B31B 70/266* (2017.08); *B31B 70/62* (2017.08); *B31B 70/68* (2017.08); *B65D 31/02* (2013.01); *B65D 31/10* (2013.01); *B29C 65/1406* (2013.01); *B29C 65/4845* (2013.01); *B29C 66/133* (2013.01); *B29C 66/4312* (2013.01); *B29C 66/71* (2013.01); *B29C 66/7292* (2013.01); *B29C 66/7352* (2013.01); *B29C 66/73711* (2013.01); *B29L 2031/7128* (2013.01); *B31B 2150/10* (2017.08); *B31B 2160/20* (2017.08); *B31B 2170/20* (2017.08)

(58) Field of Classification Search
CPC ................ B29C 66/4322; B29C 65/48; B29C 66/30325; B29C 66/8511; B29C 65/74; B29C 66/729; B29C 66/73711; B29C 66/7352; B29C 66/71; B29C 65/4845; B29C 66/7292; B29C 66/133; B29C 66/4312; B29C 65/1406; B31B 70/62; B31B 70/25; B31B 70/008; B31B 70/266; B31B 70/68; B31B 70/142; B31B 2160/20; B31B 2150/10; B31B 2170/20; B65D 31/10; B65D 31/02; B29L 2031/7128

See application file for complete search history.

(56) References Cited

OTHER PUBLICATIONS

International Search Report and Written Opinion, PCT/US16/048188, 15 pages, dated May 15, 2017.
International Search Report and Written Opinion, PCT/US16/048188, 6 pages, dated Oct. 18, 2018.

US 10,899,086 B2

STRENGTHENED SEAM ARTICLES AND METHODS OF MAKING THE SAME

CROSS-REFERENCE TO RELATED APPLICATIONS

This application is a 35 U.S.C. § 371 national stage application of PCT Patent Application No. PCT/US2016/048188, filed Aug. 23, 2016, which is incorporated by reference in its entirety.

TECHNICAL FIELD

The present disclosure relates generally to articles of manufacture formed from one or more material sheets, and relates more specifically to articles, such as packaging bags or sleeves having a mechanically strengthened seam and methods for making the same.

BACKGROUND

Flexible material sheets are used in a variety of applications, such as packaging, to provide inexpensive structures, and coverings and containers for goods. Such material sheets may be formed from a variety of materials, such as polymer films. In many applications, such flexible material sheets are formed into the desired structure by providing one or more seams of the material. Such seams may be sealed by any suitable means, such as sewing, heat sealing, or adhesive sealing.

In adhesive sealed seams, a chemical or adhesion bond is achieved between the surfaces of the material sheet; however, such adhesive bonds often suffer from poor seam strength and are susceptible to undesired peeling of the material sheets forming the seam.

One example of a type of packaging having such adhesive sealed seams is a woven polypropylene sack, such as those commonly used to package bulk items such as pet food. Traditionally these sacks were closed with a sewn end; however, the sewn end resulted in small holes at the site of the stitches, allowing the contents to become infested with insects and mites. One solution for making a clean, well-sealed, and infestation-resistant end on a woven polypropylene sack is a "step-cut" or "pinch bottom" end. Generally, pinch bottom bags are closed at the manufacturer at one end (i.e., on the "factory" or "manufacturer" end) and closed at the customer, after being filled with a product, at the other end (i.e., the "field" or "customer" end). Such pinch bottom bags typically include a longitudinal seam extending between the pinch bottoms ends. This longitudinal seam may be heat sealed or sealed with an adhesive; however, such adhesive-sealed longitudinal seams typically suffer from weak seam strength and are susceptible to undesired pealing at the seam.

Accordingly, there is a need for articles having adhesive bonded seams with improved strength.

SUMMARY

In one aspect, an article of manufacture, such as a packaging bag or sleeve, includes at least one material sheet and a seam formed from an overlap of two portions of the at least one material sheet and an adhesive deposited between the two portions of the at least one material sheet along at least a portion of the overlap, the adhesive sealing the two portions of the at least one material sheet, wherein at least one of the two portions of the material sheet has a plurality of indents on a surface thereof, such that the adhesive penetrates the material sheet at the indents to provide a mechanical bond between the two portions of the at least one material sheet.

In another aspect, a method of making an article of manufacture includes forming a plurality of indents on a surface of a first portion of a first material sheet, depositing an adhesive along at least a portion of the first portion of the first material sheet and/or along either at least a portion of a second portion of the first material sheet or at least a portion of a portion of a second material sheet, and forming a seam including an overlap of the first portion of the first material sheet and either the second portion of the first material sheet or the portion of the second material sheet, such that the adhesive is disposed between and seals the first portion of the first material sheet and either the second portion of the first material sheet or the portion of the second material sheet along at least a portion of the overlap, wherein the adhesive penetrates the first material sheet at the indents to provide a mechanical bond between the first portion of the first material sheet and either the second portion of the first material sheet or the portion of the second material sheet.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. In some figures, the relative size of certain elements and/or components exaggerated for ease of illustration. Throughout this disclosure, depending on the context, singular and plural terminology may be used interchangeably.

DETAILED DESCRIPTION

Figure 1:
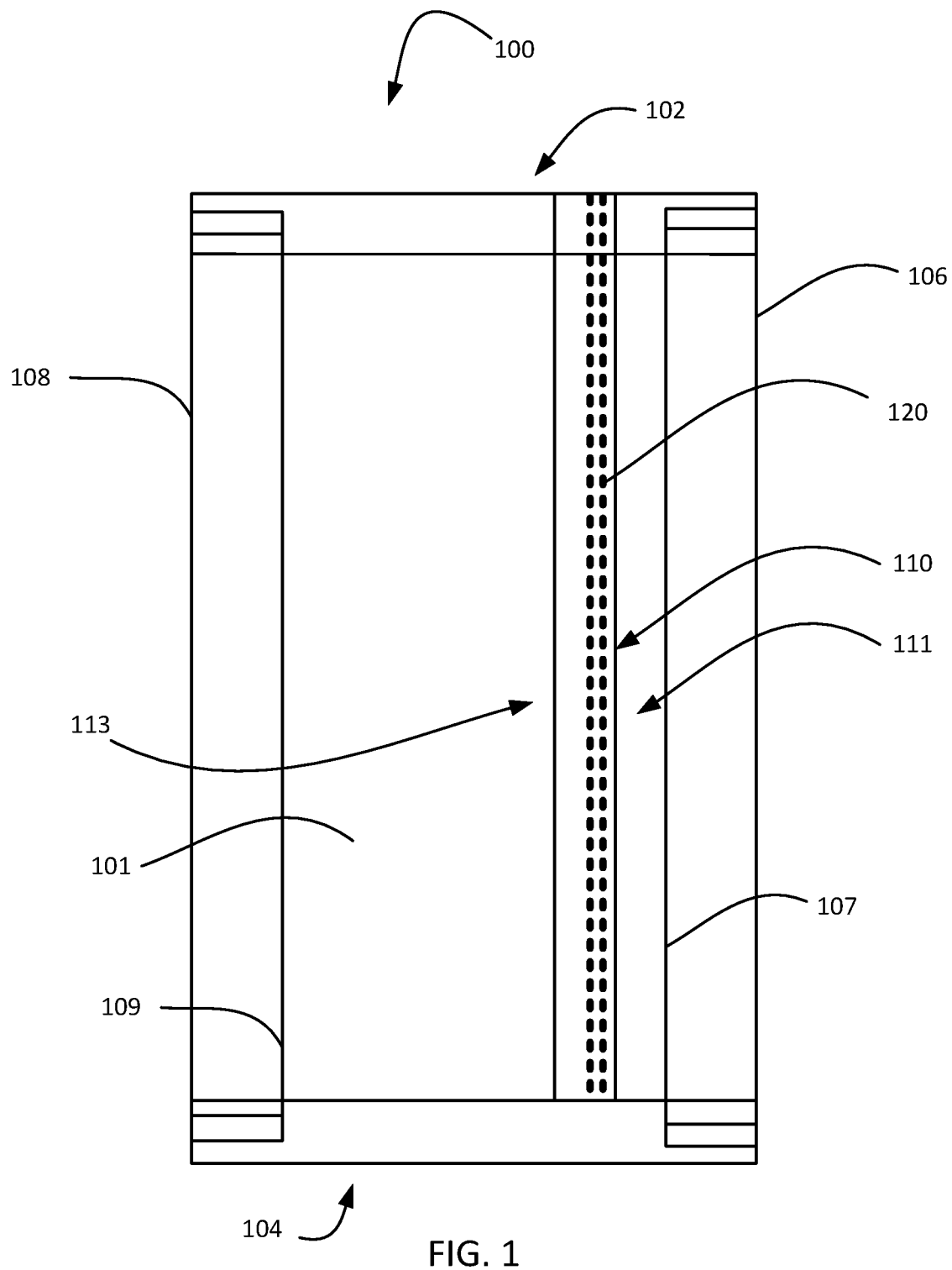
FIG. 1 is a plan view, showing a seamed tubular body having step cuts in the first and second ends.

The present disclosure addresses the above-described needs by providing improved strength at the seam area of an article of manufacture. For example, such articles of manufacture may be any articles formed by at least one material sheet and having a seam formed by an overlap of two portions of the one or more material sheets and an adhesive deposited between the two portions of the material sheet(s).

For example, such articles may include various types of packaging, clothing, coverings, and other structures formed from material sheets and at least one seam.

Thus, a variety of articles are intended to fall within the scope of this disclosure, including any articles formed from at least one material sheet and at least one adhesively sealed seam. While the subject matter of this disclosure is primarily described with reference to articles for packaging goods, such as certain bags including pinch bottom bags, the scope of the disclosure is not so limited. Indeed, any article of manufacture formed from a material sheet and having an adhesively sealed seam is meant to be encompassed by this disclosure.

As used herein, the term "adhesive" is used broadly to refer to any chemical adhesive or resin that is applied to a material sheet and functions to chemically bind or adhere the material sheet to another portion of a material sheet. For example, the adhesives disclosed herein include solvent-based adhesives, polymer dispersion adhesives, pressure-sensitive adhesives, contact adhesives, hot melt adhesives, and reactive adhesives. For example, the adhesive may be solventless, solvent-based, water based, UV or EB cured adhesives, or extrusion lamination resins. In certain embodiments, the adhesives disclosed herein are applied as a molten hot melt or an extruded resin, such as extruded polypropylene resin. For example, the hot melt adhesive may be a polyolefin based hot melt adhesive, such as a polyethylene or polypropylene based hot melt.

The material sheets described herein may be any suitable material sheet depending on the desired application. For example, the material sheets may be formed from paper, polymer or metal films, natural or synthetic fibers (woven or non-woven), and other suitable materials. Moreover, the material sheets described herein may be monolayer or multilayer structures. In many applications, the material sheets are formed into the desired structure by providing one or more seams of the material by forming an overlap of at least two portions of a single material sheet or of multiple material sheets.

In certain embodiments, an article of manufacture includes at least one portion of the material sheet having a plurality of indents on a surface thereof, such that the adhesive penetrates the material sheet at the indents to provide a mechanical bond between the two portions of the at least one material sheet. As used herein, the term "indent" is used broadly to refer to any modification of the surface of the material sheet that increases the surface area exposed to the adhesive. For example, indentations may be formed by any suitable means, including, but not limited to, engraving, embossing, perforating, notching, scoring, texturizing, and incising. In certain embodiments, the indents extend wholly or partially through the solid layer of the material sheet in which they are formed. Thus, the plurality of indents provides increased strength at the seam (e.g., a longitudinal, transverse, or other seam of the article) by providing a mechanical bond by increasing surface area of the adhesion and providing an additional direction of force required for separation (i.e., preventing easy peeling at the seam).

Articles of manufacture having increased seam strength and methods of making the same are described in detail herein. Parameters of different steps, components, and features of the embodiments are described separately, but may be combined consistently with this description and the appended claims to enable still other embodiments as will be understood by those skilled in the art.

Strengthened Seam Articles

Figure 3:
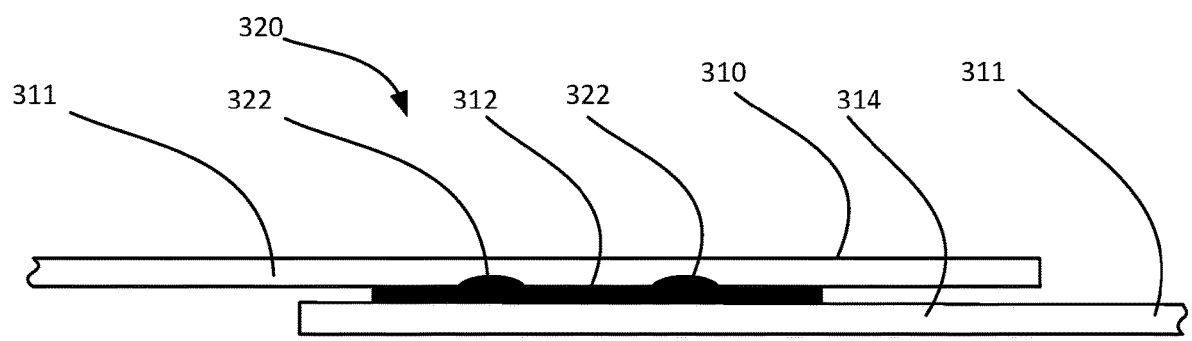
FIG. 3 is a cross-sectional partial plan view, showing a seam formed by an overlap of the material sheet and adhesive.

Articles of manufacture having increased seam strength are provided, as shown in FIG. 3, including at least one material sheet 311, and a seam 320 formed from an overlap of two portions 310, 314 of the at least one material sheet 311 and an adhesive 312 deposited between the two portions 310, 314 of the at least one material sheet 311 along at least a portion of the overlap, the adhesive sealing the two portions 310, 314 of the at least one material sheet 311. In certain embodiments, the at least one material sheet is a single material sheet and the overlap is formed of two portions (e.g., ends, edges) of the single material sheet. In other embodiments, the at least one material sheet is two material sheets and the overlap is formed by a portion (e.g., end, edge) of each material sheet.

In certain embodiments, as shown in FIG. 3, at least one of the two portions 310, 314 of the material sheet 311 includes a plurality of indents 322 on a surface thereof, such that the adhesive 312 penetrates the material sheet 311 at the indents 322 to provide a mechanical bond between the two portions 310, 314 of the at least one material sheet 311. For example, the plurality of indents may be formed in any suitable size, shape, and pattern to achieve the desired sealing strength.

Figure 6:
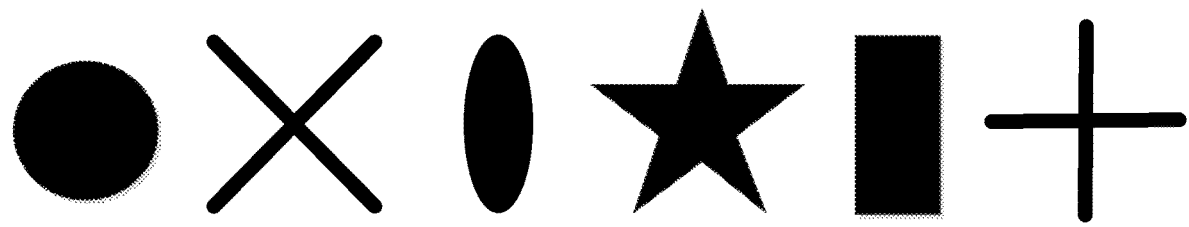
FIG. 6 is a plan view of a variety of indent shapes suitable for use in embodiments of the articles described herein.

For example, FIG. 6 shows a variety of indent shapes suitable for use in the articles of manufacture described herein. In certain embodiments, the indents have an elongated slit shape, a round shape, or another suitable shape (e.g., rectangular, star shaped, elliptical).

In certain embodiments, the indents each have a major lateral dimension of from about 10 μm to about 1 mm and a depth of from about 1 μm to about 100 μm. For example, the indents may have a width, length, or diameter of from about 0.005 mm to about 10 mm, such as from about 0.01 mm to about 5 mm, or from about 0.1 mm to about 1 mm. In certain embodiments, the indents have a length of from about 0.005 mm to about 10 mm, such as from about 0.01 mm to about 5 mm, or from about 0.1 mm to about 1 mm. In certain embodiments, the indents are have a major dimension that measures less than 1 mm. In one embodiment, the indents are circular with a diameter of approximately 0.3 mm.

For example, the indents may have a depth of from about 10 percent to about 100 percent of the thickness of the material sheet, or layer of the material sheet, in which they are disposed. For example, the indents may have a depth that is from about 10 percent to about 90 percent of the thickness of the material sheet, such as from about 10 percent to about 50 percent of the thickness of the material sheet, of from about 20 percent to about 50 percent of the thickness of the material sheet. In certain embodiments, the thickness (i.e., gauge) of the material sheet is from about 50 gauge to about 70 gauge (i.e., 0.5 to 0.7 mil), or about 70 gauge to about 120 gauge (i.e., 0.7 to 1.2 mil), or about 50 gauge to about 120 gauge (i.e., 0.5 to 1.2 mil).

Figure 4:
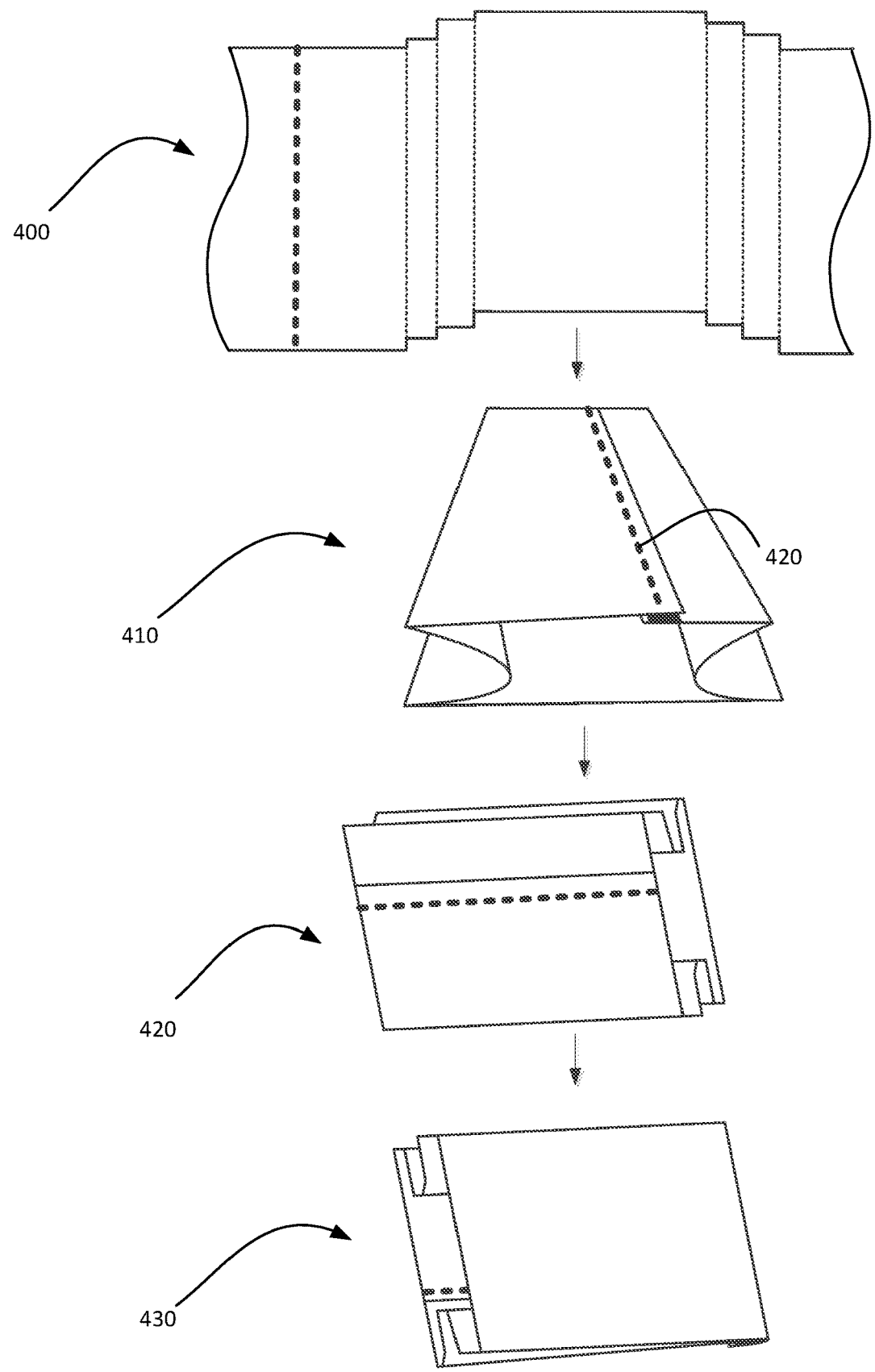
FIG. 4 is a process diagram, showing a method of making a sleeve for a pinch bottom bag.
Figure 8:
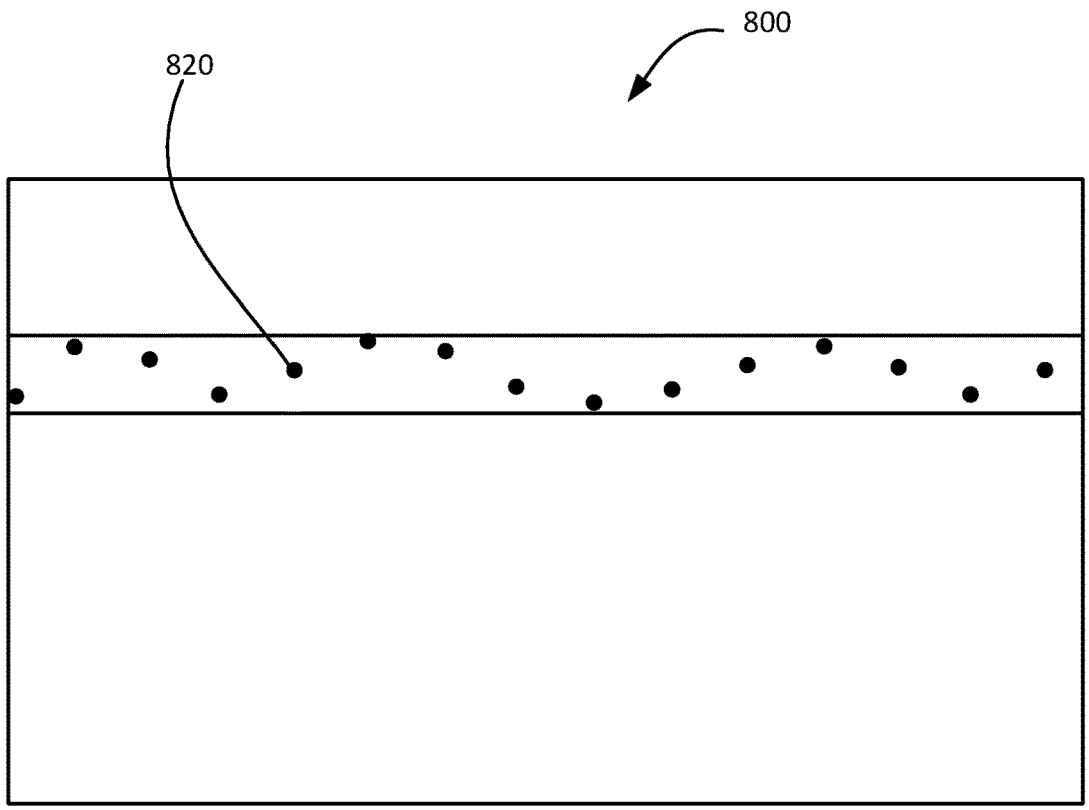
FIG. 8 is a plan view showing a seamed tubular body having a plurality of indents at the seam.
Figure 9:
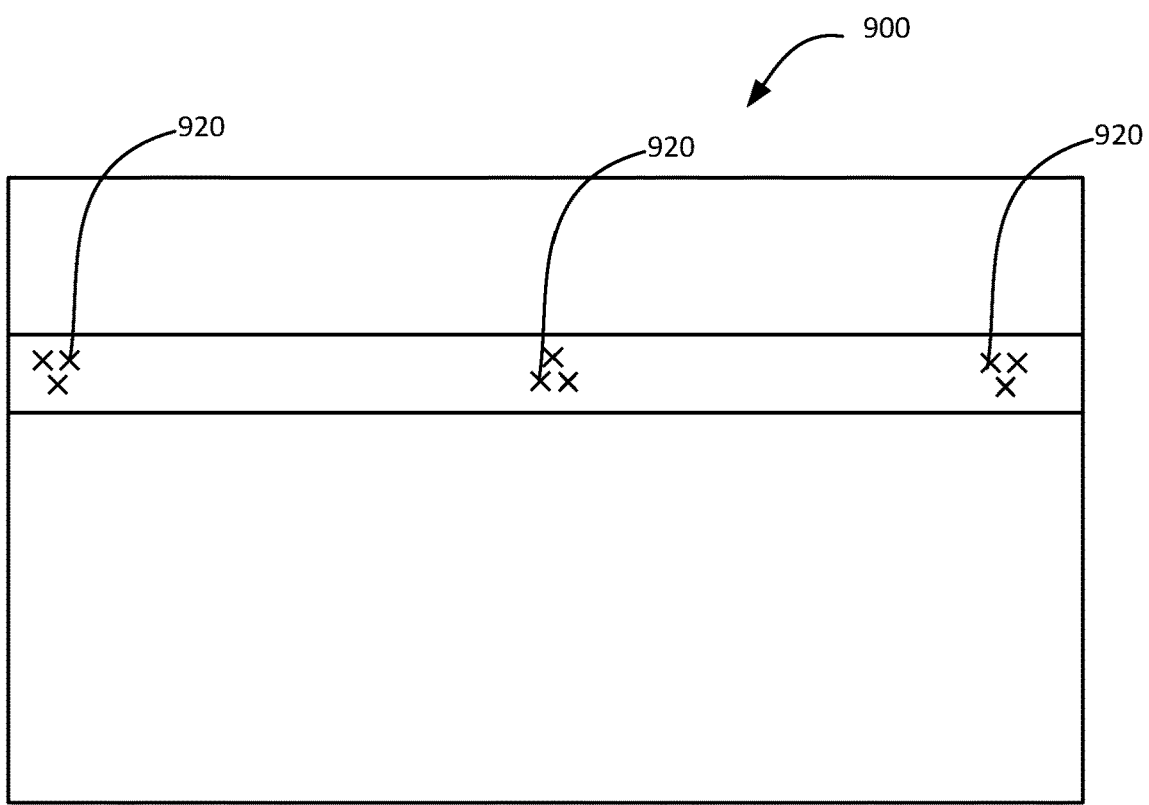
FIG. 9 is a plan view showing a seamed tubular body having a plurality of indents at the seam.

The plurality of indents may be provided in any suitable pattern, line, or design. In some embodiments, the indents may be provided as a series of indents extending along at least a portion of the region of the article to which adhesive will be applied. In other embodiments, the indents may be provided as an intermittent or discontinuous series or cluster of indents, such that the indents are provided along only a portion of the article. For example, a series of indents may be provided at a central region of the article to which adhesive will be applied (e.g., a central region of the portion of the material sheet forming the overlap). For example, as shown in FIG. 4, the indents 420 may be provided as repeating indents in a single line. For example, as shown in FIG. 1, the indents 120 may be provided as repeating indents in two parallel lines. For example, as shown in FIG. 8, the indents 820 may be provided in a serpentine or oscillating line across at least a portion of the region to which adhesive will be applied. For example, as shown in FIG. 9, the indents 920 may be provided in one or more clusters at regular or intermittent spacing. Moreover, as described above, the indents may be formed by a variety of suitable methods, including engraving, embossing, perforating, notching, scoring, texturizing, and incising.

Figure 7:
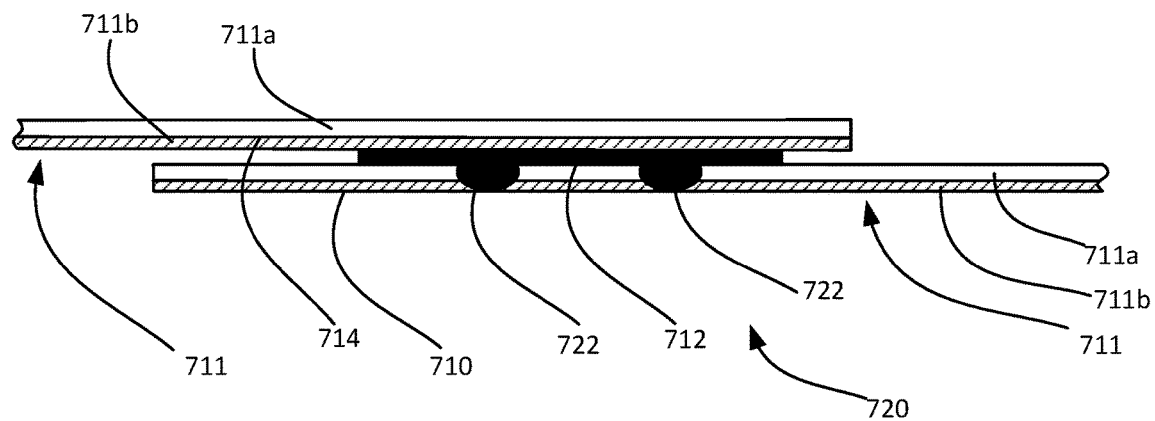
FIG. 7 is a cross-sectional partial plan view, showing a seam formed by an overlap of the material sheet and adhesive.

In certain embodiments, the indents extend wholly or partially through the layer of the material sheet in which they are formed. That is, the indents may have a depth that is equal to or less than a thickness of the material sheet, or a layer of a material sheet, in which they are disposed. That is, as shown in FIG. 3, in some embodiments, the indents 322 may not fully penetrate the material sheet 311 in which they are formed. In other embodiments, the indents may fully penetrate the material sheet, providing a through-hole in the material sheet. For example, as shown in FIG. 7, in some embodiments in which the material sheet 711 is a multilayer material, at least one layer of the material sheet may be a solid layer 711a while one or more other layers may be woven or otherwise permeable layers 711b. In such embodiments, the indents 722 may be provided at least in the solid layer 711a of the multilayer material and, again, may partially (not shown) or completely extend through the solid layer 711a.

For example, in some embodiments, as shown in FIG. 7, the at least one material sheet 711 is a multilayer sheet formed from a solid film layer 711a and a permeable, woven layer 711b. As shown, seam 720 is formed from an overlap of two portions 710, 714 of the at least one material sheet 711 and an adhesive 712 deposited between the two portions 710, 714 of the at least one material sheet 711 along at least a portion of the overlap, the adhesive sealing the two portions 710, 714 of the at least one material sheet 711. The overlap shown in FIG. 7 forms a lap seam, such that the solid film layer 711a and the permeable, woven layer 711b face one another at the overlap. That is, the seam may be a lap seam that is formed by adhering the inner and outer surfaces of the material sheet. In other embodiments, the overlap forms a fin seam, such that the solid film layers face one another at the overlap.

In certain embodiments, the article of manufacture described herein is a sleeve for forming a bag or sack, or a partially or completely formed bag or sack. Bags or sacks formed from such sleeves are also provided herein. In certain embodiments, as shown in FIG. 1, a sleeve 100 includes a tubular body 101 formed of a material sheet and a longitudinal seam 110 formed from an overlap of two portions 111, 113 of the material sheet and an adhesive (not shown) deposited between the two portions 111, 113 of the material sheet along at least a portion of the overlap, the adhesive sealing the two portions 111, 113 of the material sheet to form the seam 110.

In a flattened configuration, as shown in FIG. 1 (which illustrates a plan view of a transparent bag, such that both step cut ends and the full longitudinal seam are visible), the body 101 includes a first edge 106 in the longitudinal direction, a second edge 108 in the longitudinal direction, a first face panel between the first and second edges 106, 108 having the seam 110 therein, a second face panel between the first and second edges 106,108 and opposite the first face panel. In some embodiments, as shown in FIG. 1, the sleeve further includes a first end 102 having a step cut that is configured to fold over the first or second face panel and be affixed thereto. That is, the tubular body may be designed such that the step cut is formed to fold over either the first or second face panel, depending on the desired bag design. At least one of the two portions 111, 113 of the material sheet has a plurality of indents 120 on a surface thereof, such that the adhesive penetrates the material sheet at the indents 120 to provide a mechanical bond and, thereby, enhanced seam strength.

As used herein, the term "step cut" refers to a material having stepped portions cut therein, the stepped portions forming a flap that can be folded over an overlapped portion of a tubular body formed thereof. For example, as shown in FIG. 1, the tubular body 101 includes a step cut first end 102 and a step cut second end 104, each step cut end having multiple steps at the gussets 107, 109 of the first and second edges 106, 108 and being configured to be foldable over a portion of the tubular body 101 (i.e., the first or second face panels). Each step cut end may include one or more steps. The step cuts are configured to form "pinch bottom" ends of the bag upon being folded and sealed on the overlapped portion of the bag body. In certain embodiments, as shown in FIG. 4, the step cut ends are configured such that the overlapping folds are folded toward opposite faces of the tubular body.

Figure 2:
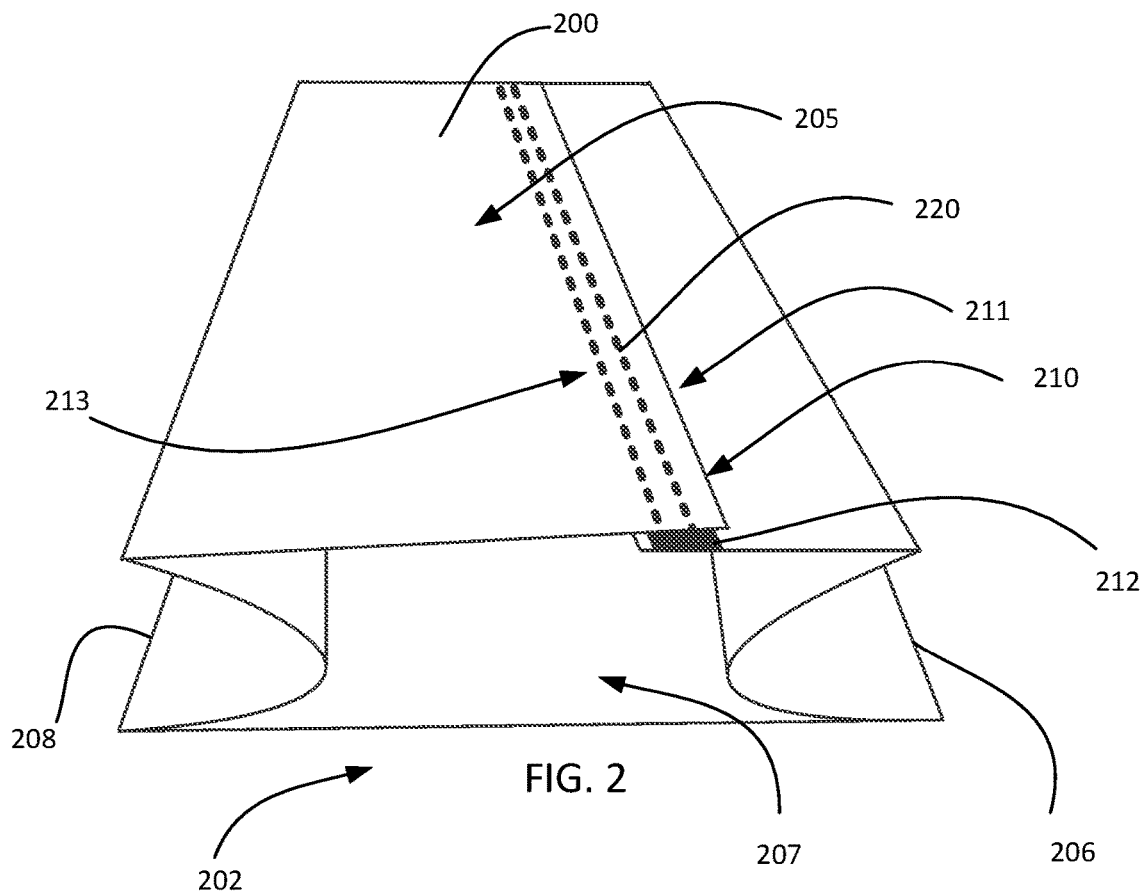
FIG. 2 is a perspective view, showing a seamed tubular body.

As shown in FIG. 2, the tubular body 200 includes seam 210, which extends longitudinally relative to the tubular body 200. The seam 210 may be formed by overlapping longitudinal end portions 211, 213 of a material web, to form a tubular body 200. For example, as shown in FIG. 2, the seam 210 may be a lap seam. In other embodiments, the seam may be a fin seam (not shown). The seam 210 further includes an adhesive 212 deposited between the two portions 211, 213 of the material sheet along at least a portion of the overlap, the adhesive being configured to seal the two portions 211, 213 of the material sheet to form the seam 210. In some embodiments, the seam 210 is positioned off-center in the first face panel 205, and the plurality of indents 220 are disposed on a surface of the at least one of the two portions 211, 213 of the material sheet forming a wider section of the first face panel 205 (i.e., the second portion 213 in the embodiment shown in FIG. 2).

In certain embodiments, as shown in FIG. 2, tubular body 200 includes a first edge 206 in the longitudinal direction, a second edge 208 in the longitudinal direction, a first face panel 205 between the first and second edges 206, 208 and having the seam 210 therein, a second face panel 207 between the first and second edges and opposite the first face panel 205, a first open end 202 having a step cut configured to fold over the first face panel 205. In certain embodiments, the first and second edges, 206, 208, each include a gusset. For example, as shown in FIG. 1, the step cuts of the first and second ends 102, 104, may be located at the gussets 107, 109. In other embodiments, as shown in FIGS. 8 and 9, the tubular body 800,900 does not have any gussets and/or is not step cut on the ends. For example, the sleeve may be configured to form a pillow bag with no gussets and/or may have flush cut ends.

FIG. 3 illustrates an embodiment of a lap seam 320 formed by an overlap of two portions 310, 314 of the material sheet and an adhesive 312 deposited between the two portions 310, 314 of the material sheet along at least a portion of the overlap, the adhesive 312 sealing the two portions 310, 314 of the material sheet to form the seam 320. At least one of the two portions 310, 314 of the material sheet (in FIG. 3, first portion 310) has a plurality of indents 322 on a surface thereof, such that the adhesive 312 penetrates the material sheet at the indents 322 to provide a mechanical bond and, thereby, enhanced seam strength.

As mentioned above, the material sheets described herein may be any suitable material sheet depending on the desired application. For example, the material sheets may be formed from paper, polymer or metal films, natural or synthetic fibers (woven or non-woven), and other suitable materials. Moreover, the material sheets described herein may be monolayer or multilayer structures.

In certain embodiments, the at least one material sheet is a laminated structure formed from a film material and a woven material. For example, the film material may be a polypropylene, polyethylene terephthalate, or nylon film. For example, the woven material may be a woven polypropylene. In such embodiments, as discussed above, the indents may be formed on the surface of the at least one material sheet formed by the film material. In some embodiments, the material sheet includes one or more coating materials, such as polypropylene or polyethylene.

Certain embodiments of the material sheet construction, listed from outer layer to inner layer, include: oriented polypropylene film/lamination resin/woven polypropylene fabric; and oriented polypropylene film/film adhesive/oriented polypropylene film/lamination resin/woven polypropylene fabric. One embodiment of the material sheet construction, listed from outer layer to inner layer, includes: oriented polypropylene film/printing ink/polypropylene extrusion resin/woven polypropylene fabric. In some embodiments, a coating may be applied to the woven polypropylene fabric so that it is exposed on the inner surface for purposes such as sealing and barrier. In embodiments, the oriented polypropylene film could be replaced by a polyethylene terephthalate or nylon film by changing the extrusion lamination resin.

For example, the oriented polypropylene film could have a thickness of from about 15 to about 30 microns, such as about 17 microns, and the woven polypropylene fabric could have a fiber density of from about 40 to about 80 $g/m^2$, such as about 70 $g/m^2$. The film adhesives used to form the material sheet structure could be any suitable adhesive material, including solventless, solvent based, water based, UV or EB cured adhesives, or extrusion lamination resins. In some embodiments of the material sheet, the film adhesive is used in an amount of from about 1 to about 5 $g/m^2$, such as about 2 $g/m^2$. The extrusion lamination resin can contain polyethylene, polypropylene, ethylene acrylic acid, ethyl methyl acrylate, or a combination thereof. The extrusion lamination resin may also contain white masterbatch or adhesion promoting additives. In one embodiment, the extrusion lamination resin contains a mix of low density polyethylene and polypropylene. For example, the extrusion lamination resin may be present in an amount of from about 10 to about 30 $g/m^2$, such a about 22 $g/m^2$.

Advantageously, it has been found that providing indents at a portion of the overlap area forming the seal allows the adhesive to penetrate the material sheet such that a mechanical bond is produced in addition to the chemical adhesion bond. Thus, the articles, including the sleeves and bags, described herein display improved strength at the seam area.

Methods for Making a Strengthened Seam Article

Methods of making an article of manufacture are also provided herein, including (i) forming a plurality of indents on a surface of a first portion of a first material sheet, (ii) depositing an adhesive along at least a portion of the first portion of the first material sheet and/or along either at least a portion of a second portion of the first material sheet or at least a portion of a portion of a second material sheet; and (iii) forming a seam from an overlap of the first portion of the first material sheet and either the second portion of the first material sheet or the portion of the second material sheet, such that the adhesive is disposed between and seals the first portion of the first material sheet and either the second portion of the first material sheet or the portion of the second material sheet along at least a portion of the overlap, wherein the adhesive penetrates the first material sheet at the indents to provide a mechanical bond between the first portion of the first material sheet and either the second portion of the first material sheet or the portion of the second material sheet. The methods may be used to form an article of manufacture having any features, or combination of features, described herein. Moreover, these methods may be utilized in any suitable sealing or laminating processes to achieve improved mechanical grip between materials.

Forming the indents on the surface of the material sheet may be done using any suitable on- or off-line process, including but not limited to, laser cutting or scoring, and/or cutting with a die, such as with a reciprocating die. Moreover, forming the indents on the surface of the material sheet may be performed at the time of depositing the adhesive or prior to depositing the adhesive.

Advantageously, in certain processes, the steps of cutting to form the feature of the article (e.g., sleeve or bag) and forming the indents in the material sheet may all be performed using the same rotary cutting machine, limiting the need for additional machinery or equipment to provide the strengthened seam articles. Alternatively, the cutting and/or indenting steps may be performed with a laser cutting machine or other suitable scoring or cutting machines.

In some embodiments, the method also includes forming indents at the first and/or second ends of the tubular body, such as at the step cut or flush cut flap area that is configured to be folded over and affixed to a face panel. For example, the surface of one or both of the ends and/or the portion of the tubular body to which the folded end is affixed, may include a plurality of indents, such that an adhesive applied to seal the end area penetrates the material sheet at the indents to provide a mechanical bond.

In certain embodiments, applying or depositing an adhesive at the seam area and/or at the ends of the article (e.g., tubular body) includes extruding a hot melt adhesive resin. For example, the width of the extruded resin ribbon (for example, see 212 in FIG. 2) may be selected to be similarly sized or slightly larger than a width of the indent region of the material sheet. For example, a 20 mm wide ribbon of hot melt resin may be deposited on an indent area containing two parallel lines of indents that are spaced from one another over a width of about 20 mm.

In certain embodiments, the position and width of the adhesive applied to the seam area of the article (e.g., tubular body) is such that the adhesive completely covers the indents in embodiments in which the indents extend through at least the solid film of the material sheet. That is, in embodiments in which the depth of the indents is equal to or greater than the thickness of the solid film of the material sheet, the adhesive should be applied to cover the indents completely, where a wholly sealed article is desired. In embodiments in which the depth of the indents is less than the thickness of the material sheet (or of a solid film layer thereof), the adhesive may or may not completely cover the indents.

For example, in certain embodiments, as shown in FIG. 2, the article of manufacture is a sleeve for forming a bag, and the method further includes forming a tube 200 of the first material sheet, the tube having the seam 210 in the longitudinal direction, and flattening the tube 200 into a flattened body including a first edge 206 in the longitudinal direction, a second edge 208 in the longitudinal direction, a first face panel 205 between the first and second edges 206, 208 and having the seam 210 therein, a second face panel 207 between the first and second edges 206,208 and opposite the first face panel 205.

In certain embodiments, as shown in FIG. 4, methods for making sleeves for the strengthened seam pinch bottom bags described herein include: (i) step cutting or forming perforations that provide the step cut in a material sheet at a first end (step 400), (ii) forming a plurality of indents on a surface of a first portion of the material sheet (step 400), before or after step cutting/perforating the material sheet, (iii) depositing an adhesive along at least a portion of the first portion of the material sheet and/or along at least a portion of the second portion of the material sheet (step 410), (iv) forming a tube of the material sheet (step 410), the tube having a seam in the longitudinal direction including an overlap of the first portion of the material sheet and the second portion of the material sheet, such that the adhesive is deposited between the first and second portions of the material sheet along at least a portion of the overlap, the adhesive sealing the first and second portions of the material sheet, wherein the adhesive penetrates the material sheet at the indents to provide a mechanical bond, and (v) flattening the tube into a flattened body including a first edge in the longitudinal direction, a second edge in the longitudinal direction, a first face panel between the first and second edges and having the seam therein, a second face panel between the first and second edges and opposite the first face panel, and the first end having a step cut and being configured to fold over the first or second face panel and be affixed thereto (step 420).

In certain embodiments, the steps of optionally step cutting the web of material at the first end, optionally step cutting the web of material at the second end, and forming the plurality of indents on a surface of the first portion of the material sheet occur prior to the step of forming a tube of the web material. For example, the steps of optionally step cutting the web of material at the first end, optionally step cutting the web of material at the second end, and forming the plurality of indents, along with any other article cutting or perforation steps, may each involve cutting or perforating with a rotary die. Advantageously, the cutting and perforating steps may all be performed using the same rotary cutting machine, limiting the need for additional machinery or equipment to provide the strengthened seam bags. Alternatively, the cutting and/or perforating steps may be performed with a laser cutting machine or other suitable scoring or cutting machines. In certain embodiments, the tubular body may be formed prior to step cutting the ends and/or forming the indents.

The tube may be flattened into a flattened body having a first edge in the longitudinal direction, a second edge in the longitudinal direction, a first face panel having the seam therein, a second face panel opposite the first face panel, a first open end, and a second open end (e.g., step cut ends or flush cut ends). In one embodiment, as shown at step 430 of FIG. 4, the second end is configured to fold over second face panel and be affixed thereto, and is left open for later filling and sealing processes (e.g., hot-air welding, gluing, sewing, etc.). The second end may be pre-treated with an adhesive for subsequent sealing. For example, the adhesive may be applied to the second face panel at the area overlapped by the step cut second end and/or to the step cut end. In other embodiments, both ends of a sleeve are kept open for later processing and sealing.

In certain embodiments, the first end is folded over the first face panel and affixed thereto, for example at step 430 shown in FIG. 4. In one embodiment, the method includes applying an adhesive to the first end and folding the first end over the first face panel and affixing it thereto. For example, affixing the first end to the first face panel may include heat sealing or ultrasonic welding processes, such as hot air welding or gluing. For example, an adhesive may be applied to the first face panel at the area overlapped by the first end and/or to the end itself.

These methods advantageously allow a seam strengthening feature to be formed during the same processing steps as other features of the article, saving on processing time and costs. Furthermore, articles, such as bags or sleeves, produced by these methods are substantially impervious to insects/mites while also providing increased seam strength that is resistant to seam peeling. In particular, the indents allow the adhesive to flow into the material sheet and create a mechanical bond to further strengthen the chemical adhesion bond.

EXAMPLE

Woven polypropylene pinch bottom bags having a strengthened seam area with two parallel lines of indents extending along the length of the bag were produced in accordance with the methods disclosed herein. In particular, the bags were formed of a material sheet having the structure: oriented polypropylene film having a thickness of about 17 microns/lamination resin in an amount of about 22 $g/m^2$ (mix of low density polyethylene and polypropylene)/woven polypropylene fabric having a fiber density of about 7 $g/m^2$. The seam adhesive was a polypropylene hot melt.

Figure 5:
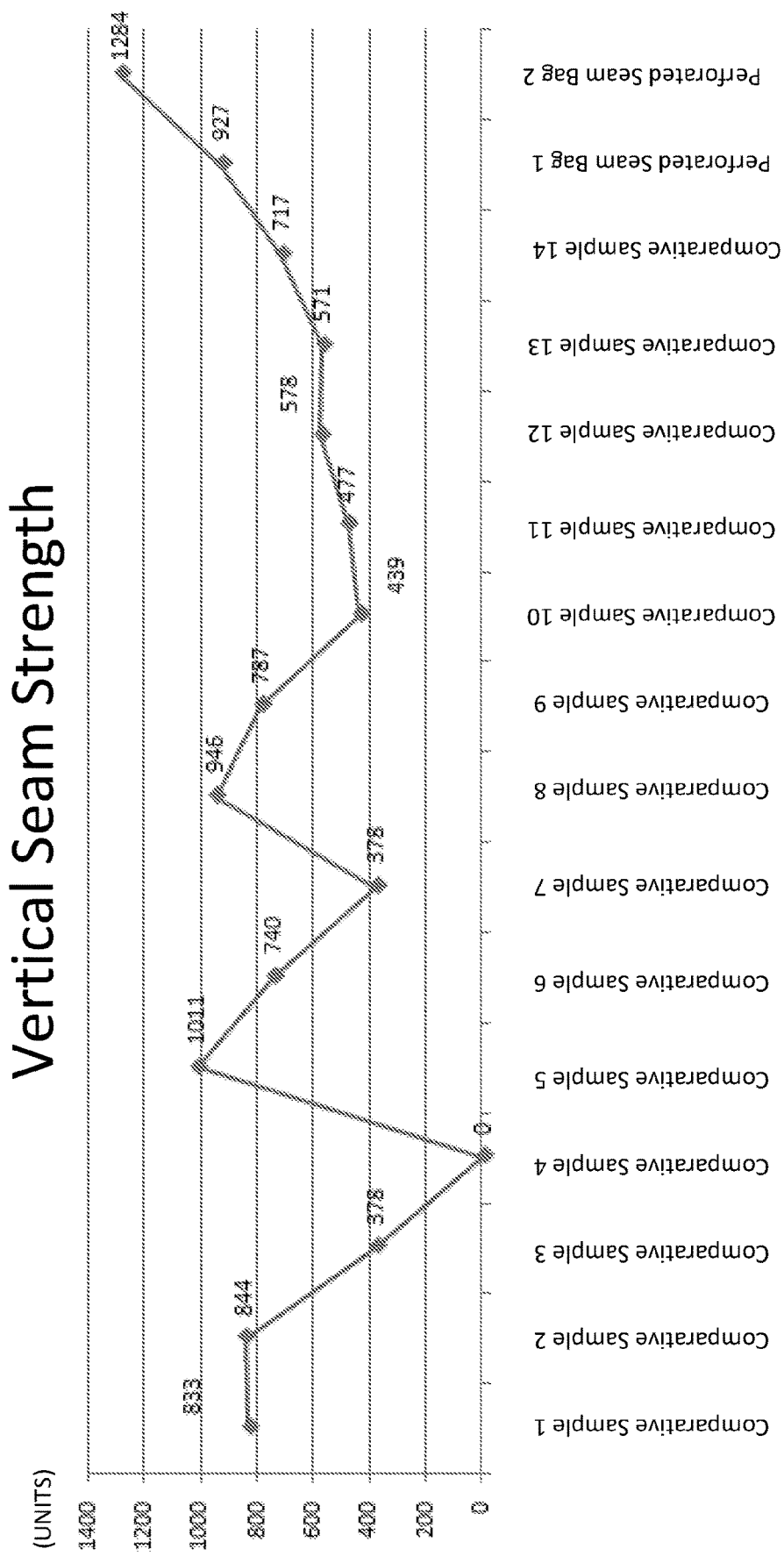
FIG. 5 is a graph showing the comparative seam strength test results of the Example.

The bags were tested for the strength of the longitudinal seam and compared to similar pinch bottom bags having no indents at the adhesive sealed seam area. The results of the tests are shown in Table 1 below and in FIG. 5.

TABLE 1

Seam Strength Test Results of Indented Seam and Comparative Bags

| Sample Description | Longitudinal Seam Strength (gram force/inch) |
|---|---|
| Comparative Sample 1 | 833 |
| Comparative Sample 2 | 844 |
| Comparative Sample 3 | 378 |
| Comparative Sample 4 | Test Results Inconclusive (0) |
| Comparative Sample 5 | 1011 |
| Comparative Sample 6 | 740 |
| Comparative Sample 7 | 378 |
| Comparative Sample 8 | 946 |
| Comparative Sample 9 | 787 |
| Comparative Sample 10 | 439 |
| Comparative Sample 11 | 477 |
| Comparative Sample 12 | 578 |
| Comparative Sample 13 | 571 |
| Comparative Sample 14 | 717 |
| Example Indented Bag 1 | 927 |
| Example Indented Seam Bag 2 | 1284 |

As can be seen from the test results, pinch bottom bags having indents in the seam area generally displayed improved or comparable seam strength as compared to similar bags having no indents at the seam area. Thus, it was determined that articles, such as pinch bottom bags and sleeves therefor, having improved seam strength and resistance to peeling at the seam could be manufactured using traditional equipment, saving on processing time and costs and providing improved seal strength properties.

It will be appreciated that various of the above-disclosed and other features and functions, or alternatives thereof, may be desirably combined into many other different products or applications. Various presently unforeseen or unanticipated alternatives, modifications, variations, or improvements therein may be subsequently made by those skilled in the art which are also intended to be encompassed by the following claims.

We claim:

1. A sleeve for forming a bag, the sleeve comprising:
   at least one flexible material sheet; and
   a seam comprising an overlap of two portions of the at least one flexible material sheet and an adhesive deposited between the two portions of the at least one flexible material sheet along at least a portion of the overlap, the adhesive sealing the two portions of the at least one flexible material sheet to form the sleeve, which is flexible,
   wherein:
      at least one of the two portions of the material sheet comprises a plurality of indents on a surface thereof, such that the adhesive penetrates the material sheet at the indents to provide a mechanical bond between the two portions of the at least one flexible material sheet,
      the at least one flexible material sheet is in the form of a tubular body,
      the seam is a longitudinal seam, and
      in a flattened configuration, the tubular body comprises:
         a first edge in the longitudinal direction;
         a second edge in the longitudinal direction;
         a first face panel between the first and second edges and having the seam therein; and
         a second face panel between the first and second edges and opposite the first face panel.

2. The sleeve of claim 1, wherein the at least one flexible material sheet has a thickness of from about 0.5 mil to 1.2 mil (0.0127 mm to 0.03048 mm).

3. The sleeve of claim 1, wherein, in the flattened configuration, the body further comprises a first end comprising a step cut configured to fold over the first or second face panel and be affixed thereto.

4. The sleeve of claim 3, further comprising a second end opposite the first end and comprising a step cut configured to fold over the first or second face panel and be affixed thereto.

5. The sleeve of claim 1, wherein the first and second edges each comprise a gusset.

6. The sleeve of claim 5, wherein the step cut of the first end is located at the gussets.

7. The sleeve of claim 1, wherein the at least one flexible material sheet comprises a laminated structure comprising a film material and a woven material.

8. The sleeve of claim 7, wherein the plurality of indents are on the surface of the at least one flexible material sheet formed by the film material.

9. The sleeve of claim 7, wherein the film material comprises polypropylene, polyethylene terephthalate, or nylon film.

10. The sleeve of claim 7, wherein the woven material comprises woven polypropylene.

11. A bag formed from the sleeve of claim 1.

12. The bag of claim 11, wherein the seam is positioned closer to the first edge than the second edge, in the first face panel.

13. A method of making a sleeve for forming a bag, comprising:
   forming a plurality of indents on a surface of a first portion of a first material sheet comprising a flexible film;
   depositing an adhesive along at least a portion of the first portion of the first material sheet and/or along either at least a portion of a second portion of the first material sheet or at least a portion of a portion of a second material sheet comprising a flexible film;
   forming a seam comprising an overlap of the first portion of the first material sheet and either the second portion of the first material sheet or the portion of the second material sheet, such that the adhesive is disposed between and seals the first portion of the first material sheet and either the second portion of the first material sheet or the portion of the second material sheet along at least a portion of the overlap, wherein the adhesive penetrates the first material sheet at the indents to provide a mechanical bond between the first portion of the first material sheet and either the second portion of the first material sheet or the portion of the second material sheet;
   forming a tube of the first material sheet, the tube having the seam in the longitudinal direction, and forming the sleeve, which is flexible; and
   flattening the tube into a flattened body comprising:
      a first edge in the longitudinal direction,
      a second edge in the longitudinal direction,
      a first face panel between the first and second edges and having the seam therein, and
      a second face panel between the first and second edges and opposite the first face panel.

14. The method of claim 13, wherein the indents comprise partial indents that have a depth that is less than a thickness of the first material sheet.

15. The method of claim 13, wherein the indents each have a major lateral dimension of from about 10 µm to about 1 mm and a depth of from about 1 µm to about 100 µm.

16. The method of claim 13, wherein the second portion of the first material sheet or the portion of the second material sheet forming the overlap with the first portion of the first material sheet comprises no indents.

17. The method of claim 13, wherein the at least one flexible material sheet has a thickness of from about 0.5 mil to 1.2 mil (0.0127 mm to 0.03048 mm).

18. The method of claim 13, further comprising cutting the first material sheet at a first end, to form a step cut configured to fold over the first or second face panel and be affixed thereto.

19. The method of claim 18, wherein the steps of cutting the material sheet at the first end to form the step cut and forming the plurality of indents on the surface of the first portion of the first material sheet comprise using a rotary die.

20. The method of claim 18, further comprising cutting the first material sheet at a second end opposite the first end, to form a step cut configured to fold over the first or second face panel and be affixed thereto.

21. The method of claim 18, further comprising applying an adhesive to the first end and folding the step cut over the first face panel and affixing it thereto.

22. A method of making the sleeve of claim 1, comprising:
providing the at least one flexible material sheet;
forming the plurality of indents on the surface of the at least one of the two portions of the at least one flexible material sheet;
depositing the adhesive along at least a portion of the overlap of the two portions;
forming the seam between the two portions of the at least one flexible material sheet, wherein the adhesive penetrates the at least one portion at the indents to provide the mechanical bond between the two portions of the at least one flexible material sheet; and
forming the sleeve by forming the tubular body of the at least one flexible material sheet,
wherein the seam is in a longitudinal direction.

23. The method of claim 22, wherein the second portion of the at least one flexible material sheet forming the overlap with the first portion of the at least one flexible material sheet comprises no indents.

24. The method of claim 22, wherein the indents comprise partial indents that have a depth that is less than a thickness of the at least one flexible material sheet.

25. The method of claim 22, further comprising flattening the tubular body into a flattened body comprising:
the first edge in the longitudinal direction,
the second edge in the longitudinal direction,
the first face panel between the first and second edges and having the seam therein, and
the second face panel between the first and second edge and opposite the first face panel.

26. The method of claim 25, further comprising cutting the at least one flexible material sheet at a first end to form a step cut configured to fold over the first or second face panel and be affixed thereto.

27. The method of claim 26, wherein the steps of cutting the at least one flexible material sheet at the first end to form the step cut and forming the plurality of indents on the surface of the first portion of the at least one flexible material sheet comprise using a rotary die.

* * * * *